(12) United States Patent
Kim

(10) Patent No.: US 8,692,499 B2
(45) Date of Patent: Apr. 8, 2014

(54) CONTROL METHOD FOR ELECTRO-MECHANICAL BRAKE SYSTEM

(75) Inventor: Myoung June Kim, Gyeonggi-do (KR)

(73) Assignee: Mando Corporation, Gyeonggi-Do (KR)

( * ) Notice: Subject to any disclaimer, the term of this patent is extended or adjusted under 35 U.S.C. 154(b) by 369 days.

(21) Appl. No.: 13/177,940

(22) Filed: Jul. 7, 2011

(65) Prior Publication Data

US 2012/0007537 A1    Jan. 12, 2012

(30) Foreign Application Priority Data

Jul. 7, 2010    (KR) .................. 10-2010-0065284

(51) Int. Cl.
*B60T 8/17*    (2006.01)
(52) U.S. Cl.
USPC ............... 318/563; 318/612; 303/62; 701/78
(58) Field of Classification Search
USPC ......... 318/563, 565, 566, 592, 611–618, 626, 318/671; 303/124, 20, 61, 62; 188/72.1; 701/71, 78
See application file for complete search history.

(56) References Cited

U.S. PATENT DOCUMENTS 3,609,495 A * 9/1971 Seesselberg ................. 318/368
8,036,802 B2 * 10/2011 Thibault ........................ 701/70
8,152,247 B2 * 4/2012 Colin ............................ 303/199

FOREIGN PATENT DOCUMENTS

| CN | 101159422 A | 4/2008 |
|---|---|---|
| CN | 201254176 Y | 6/2009 |
| JP | 2005-067401 A | 3/2005 |
| KR | 10-2004-0021913 A | 3/2004 |
| KR | 10-2009-0119486 A | 11/2009 |

OTHER PUBLICATIONS

Chinese Office Action with English Translation issued in Chinese Application No. 201110189607.5 dated Jul. 1, 2013.
Korean Office Action issued in Korean Patent Application No. KR 10-2010-0065284 dated Sep. 25, 2012.

* cited by examiner

*Primary Examiner* — Bentsu Ro
(74) *Attorney, Agent, or Firm* — McDermott Will & Emery LLP

(57) ABSTRACT

Disclosed is a method for controlling an electro-mechanical brake system including a cascade controller, in which a position controller, a speed controller and a current controller are integrated to control a motor. The method includes determining whether an actual speed of a motor exceeds a command speed of the motor in an early stage of a motor operation; and restricting speed reduction of the motor until a braking force is generated if the actual speed of the motor exceeds the command speed of the motor in the early stage of the motor operation. Speed reduction of the motor is restricted until braking force is generated even if a speed error (actual speed of the motor>command speed of the motor) occurs in the early stage of the motor operation in the EMB system, thereby improving the braking responsiveness.

4 Claims, 2 Drawing Sheets

CONTROL METHOD FOR ELECTRO-MECHANICAL BRAKE SYSTEM

This application claims the benefit of Korean Patent Application No. 10-2010-0065284 filed on Jul. 7, 2010, in the Korean Intellectual Property Office, the disclosure of which is incorporated herein by reference.

BACKGROUND

1. Field

The disclosure relates to a brake system for a vehicle. More particularly, the disclosure relates to an electro-mechanical brake system capable of braking a vehicle through the operation of an electric motor and a reduction unit.

2. Description of the Related Art

A brake system is installed in a vehicle to reduce the speed of the vehicle, to stop the vehicle or to maintain the vehicle in a parking state.

In general, a friction type brake system is mainly used as the brake system. The friction type brake system converts dynamic energy into thermal energy by using frictional force and discharges the thermal energy into the atmosphere to perform the braking operation. According to the friction type brake system, pads are hydraulically pressed against both sides of discs rotating together with vehicle wheels, thereby braking the vehicle.

However, according to the hydraulic brake system of the related art, the pads are intensely pushed toward the discs by the hydraulic pressure upon the braking operation, so the hydraulic brake system requires the complicate structure including a master cylinder operated by a booster, which boosts pedal force, to generate the hydraulic force, hydraulic lines extending to a wheel cylinder, and various devices for controlling and supporting the above components. Due to the complicate structure and use of the hydraulic pressure, the hydraulic brake system represents limitations in terms of the reliability of the braking performance and stability.

For this reason, an electro-mechanical brake (EMB) system capable of simplifying the structure and improving the reliability of the braking performance has been extensively used.

According to the EMB system, an electronic control unit (ECU) receiving electronic pedal information upon the braking operation drives a motor to generate axial driving force, so that a piston is moved in the axial direction through a reduction unit coupled to the motor. Thus, pads are pressed against discs, thereby performing the braking operation.

The motor, which is a main actuator of the EMB system, may include a BLAC type motor or a BLDC type motor. In addition, a cascade controller including a position controller (or power controller), a speed controller and a current controller can be used in order to control the motor.

If an operation command is generated when the motor of the EMB system is not operated, an operation delay may occur due to the initial inertia and stick slip. In this state, if the motor is operated, the speed controller outputs a great command signal value due to the great error caused by the operation delay, so that the overshoot of the motor may occur. If the overshoot of the motor occurs, the motor may rotate faster than the command speed of the motor controller, so the speed controller outputs the reverse command to the motor (that is, in the direction to stop the operation of the motor) in order to reduce the speed of the motor. In general, the above procedure is regarded as the correct control behavior in view of the control procedure. However, in view of the EMB system, since the motor just starts to operate, the pad does not make contact with the disc, so that the braking force is not yet generated. Thus, the motor ought to be driven approximately to the maximum speed even if the speed error (greater than the command speed) occurs. In detail, speed reduction of the motor ought to be absolutely forbidden.

SUMMARY

Accordingly, it is an aspect of the disclosure to provide a control method for an EMB system, in which speed reduction of a motor is restricted until braking force is generated even if a speed error (actual speed of the motor>command speed of the motor) occurs in the early stage of the motor operation in the EMB system, thereby improving the braking responsiveness.

Additional aspects and/or advantages of the disclosure will be set forth in part in the description which follows and, in part, will be apparent from the description, or may be learned by practice of the disclosure.

The foregoing and/or other aspects of the disclosure are achieved by providing a method for controlling an electro-mechanical brake system including a cascade controller, in which a position controller, a speed controller and a current controller are integrated to control a motor, the method comprising determining whether an actual speed of a motor exceeds a command speed of the motor in an early stage of a motor operation; and restricting speed reduction of the motor until a braking force is generated if the actual speed of the motor exceeds the command speed of the motor in the early stage of the motor operation.

According to the disclosure, the restricting of speed reduction of the motor includes setting an output command of the speed controller to zero.

According to the disclosure, the restricting of speed reduction of the motor includes controlling an input command of the current controller such that a predetermined current suitable for preventing the motor from being accelerated is applied to the motor.

According to the disclosure, the restricting of speed reduction of the motor includes controlling an input command of the current controller such that a predetermined current proportional to a position error of the motor is applied to the motor.

As described above, according to the disclosure, the speed reduction of the motor is restricted until braking force is generated even if a speed error (actual speed of the motor>command speed of the motor) occurs in the early stage of the motor operation in the EMB system, thereby improving the braking responsiveness.

BRIEF DESCRIPTION OF THE DRAWINGS

These and/or other aspects and advantages of the disclosure will become apparent and more readily appreciated from the following description of the embodiments, taken in conjunction with the accompanying drawings of which.

DETAILED DESCRIPTION OF THE EXEMPLARY EMBODIMENTS

Figure 1:
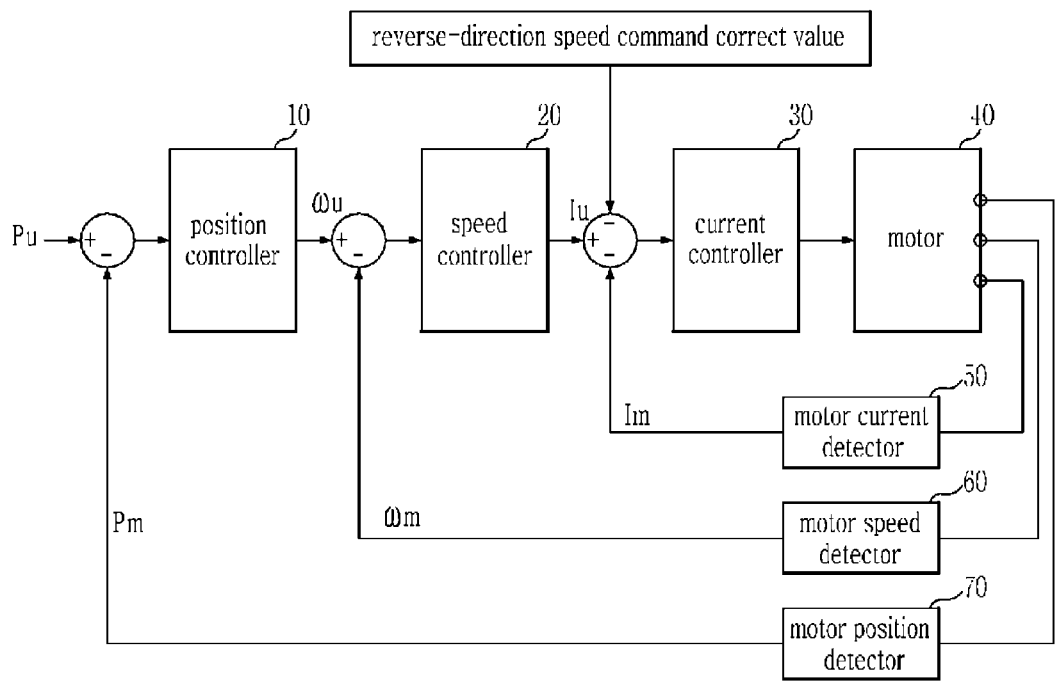
FIG. 1 is a block view showing a cascade controller for controlling a motor of an EMB system according to one embodiment of the disclosure.

Reference will now be made in detail to the embodiments of the disclosure, examples of which are illustrated in the accompanying drawings, wherein like reference numerals refer to the like elements. The embodiments are described below to explain the disclosure by referring to the figures.

FIG. 1 is a block view showing a cascade controller for controlling a motor of an EMB system according to one embodiment of the disclosure.

As shown in FIG. 1, the cascade controller for controlling the motor 40 of the EMB system includes a position controller 10, a speed controller 20, a current controller 30, a motor current detector 50, a motor speed detector 60 and a motor position detector 70.

The position controller 10 receives the motor position control command Pu from an electronic control unit (ECU, not shown) and a motor position value Pm measured by the motor position detector 70 in order to generate an output command ωu of the position controller 10. The position controller 10 is connected to the position controller 20 in series, so the output command ωu of the position controller 10 may become the motor speed control command ωu for the speed controller 20.

The speed controller 20 receives the motor speed control command ωu from the position controller 10 and the angular velocity wm of the motor measured by the motor speed detector 60 in order to generate an output command Iu of the speed controller. The speed controller 20 is connected to the current controller 30 in series, so the output command Iu of the speed controller 20 may become the motor current control command Iu for the current controller 30.

The current controller 30 receives the motor current control command Iu from the speed controller 20, the current value Im of the motor measured by the current detector 50, and the reverse-direction speed command correct value in order to generate the output command of the current controller 30.

The term "reverse-direction speed command correct value" refers to the value added to or subtracted from the output command of the speed controller 20 or the input command of the current controller 30 in order to restrict the speed reduction of the motor until the braking force is generated even if the speed error (actual speed of the motor>command speed of the motor) occurs in the early stage of the motor operation in the EMB system. The term "reverse-direction speed command correct value" will be described later in more detail.

The motor 40 serves as a main actuator of the EMB system together with a reduction unit (not shown) and a BLAC type motor or a BLDC type motor is mainly used as the motor 40.

The motor current detector 50 measures the current value Im of the motor 40 and supplies the current value Im to the current controller 30.

The motor speed detector 60 measures the angular velocity wm of the motor 40 and supplies the angular velocity wm to the speed controller 20.

The motor position detector 70 measures the position value Pm of the motor 40 and supplies the position value Pm to the position controller 10.

Figure 2:
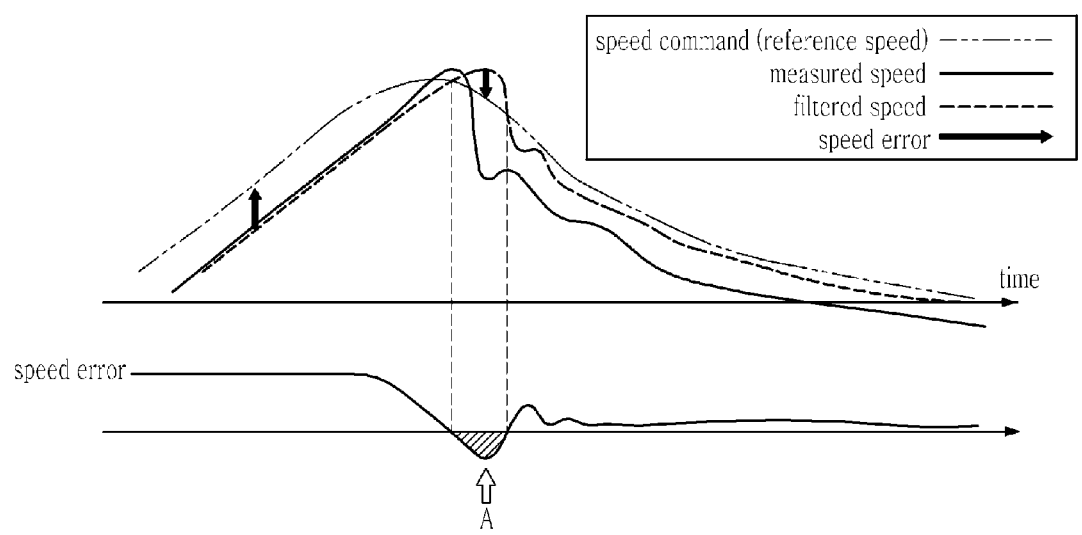
FIG. 2 is a graph for explaining a speed error occurrence point at which the control method for the EMB system according to one embodiment of the disclosure is applied.

FIG. 2 is a graph for explaining a speed error occurrence point at which the control method for the EMB system according to one embodiment of the disclosure is applied.

As described above, since the motor 40 just starts to operate in the early stage of the operation of the EMB system, the pad does not make contact with the disc, so that the braking force is not yet generated. Thus, in order to improve the braking responsiveness, the speed reduction of the motor ought to be restricted even if the speed error (actual speed of the motor>command speed of the motor) occurs.

Therefore, when the speed controller 20 starts to reduce the speed of the motor 40 because the actual speed of the motor 40 exceeds the command speed of the motor 40 in the early stage of the motor operation of the EMB system, that is, when the sign of the speed command (or reference speed) is opposite to the sign of the speed error (reference speed−actual speed of the motor), which corresponds to "A" of FIG. 2, the speed reduction of the motor is restricted to improve the braking responsiveness of the EMB system. In FIG. 2, when the speed error (reference speed−actual speed of the motor) is calculated, the motor speed obtained by filtering the measured motor speed is used as the "actual motor speed", instead of the motor speed measured by the motor speed detector 60, by taking the phase delay into consideration.

According to the disclosure, when the sign of the speed command (or reference speed) is opposite to the sign of the speed error (reference speed−actual speed of the motor), which corresponds to "A" of FIG. 2, in the early stage of the motor operation of the EMB system, the speed reduction of the motor is restricted through the following three schemes of ① the output command Iu of the speed controller 20 is set to zero, that is, the reverse-direction speed command correct value is input as the output command Iu (Iu−Iu=0), ② the input command of the current controller 30 is controlled such that a predetermined current suitable for preventing the motor 40 from being accelerated can be applied to the motor 40 (in this case, the speed reduction of the motor is more slowly proceed), ③ the input command of the current controller 30 is controlled such that a current proportional to the position error can be applied to the motor 40.

The control method of the disclosure for restricting the speed reduction of the motor is performed as the sign of the speed command (or reference speed) is opposite to the sign of the speed error (reference speed−actual speed of the motor) in the early stage of the motor operation until the braking force of the EMB system is generated.

According to the control method for the EMB system of the disclosure, the speed reduction of the motor is restricted until braking force is generated even if the speed error (actual speed of the motor>command speed of the motor) occurs in the early stage of the motor operation in the EMB system, thereby improving the braking responsiveness.

Although few embodiments of the disclosure have been shown and described, it would be appreciated by those skilled in the art that changes may be made in these embodiments without departing from the principles and spirit of the disclosure, the scope of which is defined in the claims and their equivalents.

What is claimed is:

1. A method for controlling an electro-mechanical brake system including a cascade controller, in which a position controller, a speed controller and a current controller are integrated to control a motor, the method comprising:
   determining whether an actual speed of a motor exceeds a command speed of the motor in an early stage of a motor operation; and
   restricting speed reduction of the motor until a braking force is generated if the actual speed of the motor exceeds the command speed of the motor in the early stage of the motor operation.

2. The method of claim 1, wherein the restricting of speed reduction of the motor includes setting an output command of the speed controller to zero.

3. The method of claim 1, wherein the restricting of speed reduction of the motor includes controlling an input command of the current controller such that a predetermined current suitable for preventing the motor from being accelerated is applied to the motor.

4. The method of claim 1, wherein the restricting of speed reduction of the motor includes controlling an input command of the current controller such that a predetermined current proportional to a position error of the motor is applied to the motor.

\* \* \* \* \*